May 4, 1954  J. BOUZITAT ET AL  2,677,820
SYSTEM FOR GUIDING DIRIGIBLE CRAFT
Filed Sept. 22, 1948

Inventors
Jean Bouzitat
Claude M. Ducot and
Pierre Perilhon
by Brown & Seward
Attorneys May 4, 1954  J. BOUZITAT ET AL  2,677,820
SYSTEM FOR GUIDING DIRIGIBLE CRAFT
Filed Sept. 22, 1948  4 Sheets-Sheet 2

Inventors
Jean Bouzitat
Claude M. Ducot and
Pierre Perillon
by Brown & Seward
Attorneys

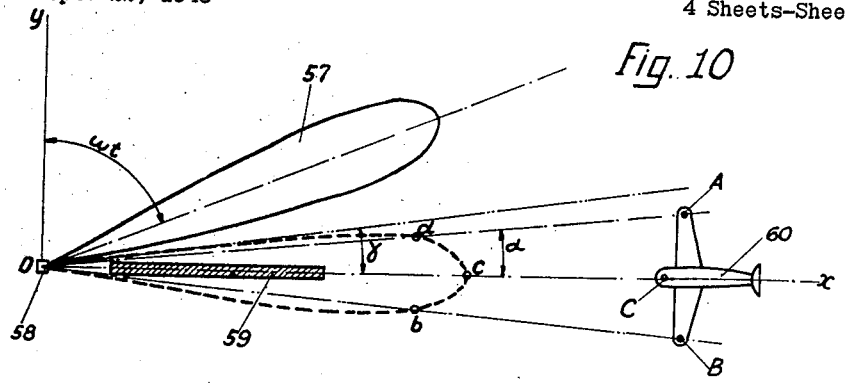
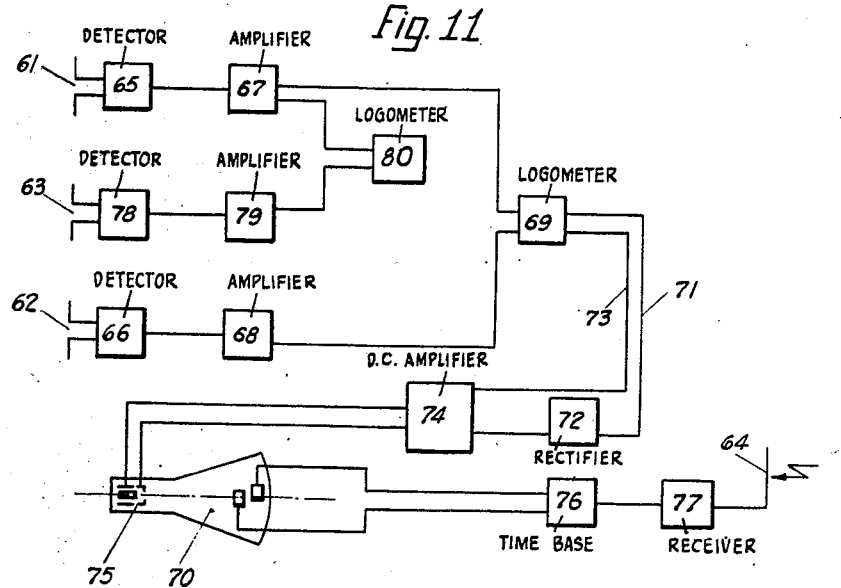
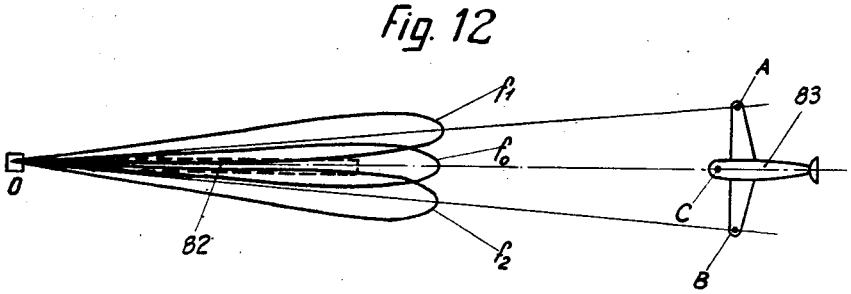

May 4, 1954    J. BOUZITAT ET AL    2,677,820
SYSTEM FOR GUIDING DIRIGIBLE CRAFT
Filed Sept. 22, 1948    4 Sheets-Sheet 4
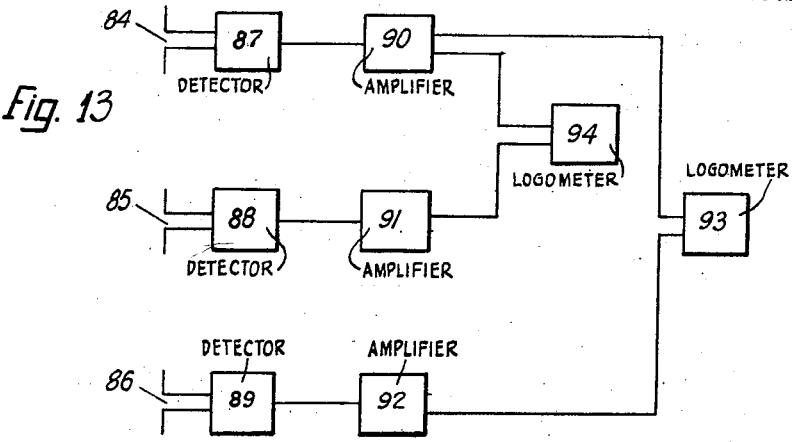
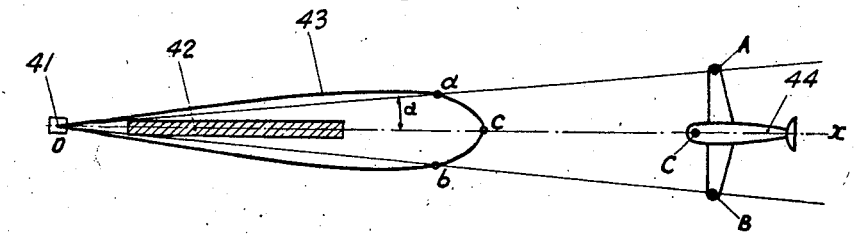
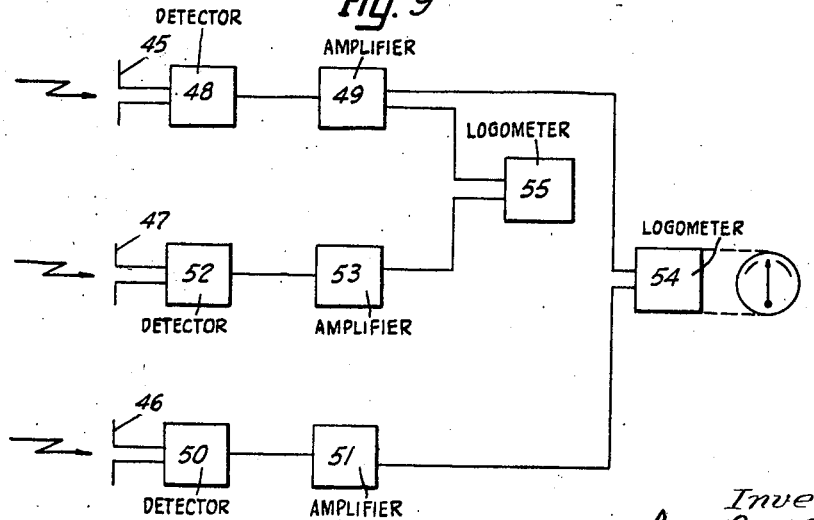
Inventors
Jean Bouzitat
Claude M. Ducotand
Pierre Parillion
by Brown & Seward
Attorneys Patented May 4, 1954

2,677,820

UNITED STATES PATENT OFFICE 2,677,820

SYSTEM FOR GUIDING DIRIGIBLE CRAFT

Jean Bouzitat, Paris, Claude M. Ducot, Neuilly-sur-Seine, and Pierre Perilhou, Clamart, France, assignors to Office National d'Etudes et de Recherches Aeronautiques, Paris, France, a company of France Application September 22, 1948, Serial No. 50,514

Claims priority, application France September 23, 1947

33 Claims. (Cl. 343—106)

This invention relates to the problem of guiding of a dirigible craft and more particularly of an aircraft following a predetermined path by means of radiant or wave energy.

An object of the invention is to provide an improved method and means for guiding a dirigible craft and more particularly an aircraft by means of a receiving system comprising at least two spaced and independent aerials carried by said craft and cooperating with a directive beam of radiant energy presenting in azimuth a variable characteristic and in which a desired indication or indications of guidance are obtained by comparing, in relation to said variable characteristic, signals received by said aerials.

Another object of the invention is to provide a novel method and means whereby a deviation of a craft with respect to a vertical plane containing a desired direction of guiding, as well as its distance to or from a point located on said direction, are simultaneously determined or indicated.

Another object of the invention is to provide a new method and means for guiding a craft following a predetermined direction whereby an indication of a deviation of the craft from said direction and an indication of its distance to or from a predetermined point on said direction are obtained or derived from a same and single beam of radiant energy presenting a variable characteristic in relation to azimuth, said indications being obtained by utilising the effects of reception of said beam on at least two spaced and independent receiving aerials.

Another object of the invention is to provide a method of guiding a dirigible craft following a predetermined direction, of the type specified above in which the characteristic, the variations of which serve for the comparison between received signals by different aerials in order to produce said indications of guidance, is an azimuth position in relation to time of said beam.

Another object of the invention is to provide a novel method and means for guiding a dirigible craft along a desired direction of guiding, by means of a rotating beam of radiant energy transmitted from a point on said direction of guiding and a reference signal transmitted at the moment of passage of said beam by said direction or a direction making a predetermined angle with said first direction, said reference signal being used to control the reception of said rotating beam by at least two receiving aerials carried by said craft, to produce indications of a deviation of the craft from said direction and of its distance to or from said point of origin of said rotating beam.

Another object of the invention is to provide a method of guiding a dirigible craft along a predetermined direction which consists in producing at a point on said direction a directed beam of wave energy radiations which is adapted to rotate in azimuth at an uniform speed, in producing at the moment of passage of said beam by said desired direction of guiding or a direction having a predetermined angle with respect to said first direction, a brief reference signal, in receiving the radiations of said rotating beam on at least two spaced and independent aerials carried by the dirigible craft to be guided and defining on said craft a distance measuring base line, in receiving said reference signal on a third independent aerial, in detecting and amplifying the signals thus received by various aerials and comparing on a time-basis, under the control of said reference signal, the signals received under the action of said beam by said two spaced aerials, to obtain simultaneously an indication of deviation of the craft from the direction of guiding as well as an indication of its distance to a predetermined point on said direction.

According to the invention, the two spaced aerials adapted for reception of the rotating beam are electrically independent one from the other and may be connected either permanently to two separate receivers or alternately to the same and single receiver, the signals corresponding to said two aerials being compared one to the other as regards their spacing in time in order to produce a desired indication of distance and with respect to the reference signal received by the third aerial for determining the deviation of the craft to one or to the other side of the desired direction of guiding.

The invention is applicable more particularly to the field of ultra short wave radiations for which the distance between the two receiving aerials adapted to cooperate with the rotating beam is relatively large when compared to the wave length of said radiations.

The invention has more particularly for its object the application of the method specified above to a blind landing of aircrafts such as aeroplanes, the effects of reception of the two spaced aerials carried by the craft and cooperating with the rotating beam of radiant energy serving in this application for the measurement of the distance of the craft to or from a desired point of landing and the correlation of effects of reception of the two spaced aerials with that of the third aerial receiving the reference signal, indexing the passage of the rotating beam by the direction of landing, determining the deviation of the craft to one or to the other side of the vertical plane containing said direction of landing.

Other objects of the invention concern certain forms of application or embodiment of the specified method and namely a first embodiment which consists in comparing, under the control of the reference signal received by the third aerial, the signals received by the two spaced aerials, on a cathode ray tube or oscilloscope so as to obtain simultaneously on a single screen or dial the two indications of directional guidance and of distance referred to above.

According to a feature of the invention the effects of reception of the two spaced aerials cooperating with a rotating beam are used to produce on the screen of a cathode tube, under the control of the reference signal, luminous signals defining on said screen a segment of straight line, the length of which is proportional to the distance of the craft from or to a predetermined point on the desired direction of guiding, which may be the landing point of the craft, and the position of which along the horizontal diameter of said screen with respect to the vertical diameter of the same gives an indication of deviation of the craft to one or to the other side of the vertical plane containing said desired direction of guiding.

According to a still further feature of the invention, said segment of straight line serving to produce at the same time the two above mentioned indications, is defined by two spaced luminous signals more particularly two luminous points the spacing of which with respect to each other is proportional to the distance of the craft with respect to a point on the desired direction of guiding and more particularly the point of landing and the position of which with respect to the vertical reference axis of the cathode tube screen gives an indication of deviation of the craft to one or the other side of the vertical plane containing the desired direction of guiding or the glide path.

According to a feature of the invention, the control depending on the reference signal is produced by causing the output of the reference signal receiver to act on the scanning device acting on one of the cathode ray tube deflection arrangements and namely that producing horizontal deflection of the cathode ray.

The invention provides further a system of the type referred to above comprising the use of pointer instruments and more particularly galvanometric instruments of a two frame type for indicating the distance of the craft to or from a predetermined point on the desired direction of guiding which may be the point of landing of the craft as well as the deviation of the craft to one or to the other side of the vertical plane containing said direction of guiding and in which the effects of reception of two spaced aerials are applied after their passage through suitable electrical devices such as Eccles-Jordan circuits followed by filters, to two instruments having each two frames and being respectively arranged for measuring a difference and a sum of signals received by the two aerials. These Eccles-Jordan and filter circuits are controlled in parallel by the output of the receiver corresponding to the aerial of reception of the reference signal.

In the above mentioned form of embodiment of the invention, the instrument of the two framed type measuring a difference between signals produced by the two aerials serves to indicate the deviation of the craft with respect to the vertical plane containing the direction of guiding or landing and the instrument measuring the sum of signals received by the two aerials serves as indicator of the distance of the craft to said point of landing.

According to a still further feature of the invention, the factor or variable serving as the basis for comparison between signals received by the aerials of the receiving system carried by the craft in order to produce a desired indication of guidance is the amplitude of radiations determined as a function of the azimuth of the receiver by the diagram of directivity of the transmitted radiant energy.

According to another feature of the invention, the factor or variable serving as the basis for comparison between signals received by the aerials of the receiving system is again the amplitude of radiations, but this amplitude is determined by the passage of a rotating beam of radiant energy by the points of location of at least two aerials of the receiving system carried by a craft.

According to a still further feature of the invention, in an arrangement such as specified in the preceding paragraph, the comparison of amplitudes of signals received by the two aerials of a receiving system is effected in a permanent manner and is used for determining with precision the instant of passage of the plan of symmetry of the rotating beam by the middle point of the straight line segment joining the two receiving aerials.

According to a still further feature of the invention, the instants of passage of the rotating beam of radiant energy by the middle point of a straight line segment joining two receiving aerials carried by a craft are determined in cooperation with a reference signal indexing the passage of the beam by a position having a predetermined angular relation with the desired direction of guidance, for producing the indications of deviations of the craft with respect to said direction and at the same time of its distance to or from the point of origin of said rotating beam of radiant energy.

The invention concerns also a method and means of the kind specified in which the factor or variable serving as the basis for comparison of received signals is a frequency and namely the frequency determined as a function of the azimuth of a receiving aerial by the digram of a variable directivity of transmitted radiations.

More particularly, according to another feature of the invention, this last mentioned embodiment of the invention is based on the use at the transmission end of an ultra high frequency dispersive aerial fed either by non monochromatic radiations or by radiations having a rapidly variable frequency.

Finally, according to another characteristic of the invention by using a greater number of receiving aerials, the proposed system may be adapted to permit various corrections of guidance of a craft, and namely the compensation of the drift.

The above and other objects and features of the invention will appear more clearly from the following description taken in connection with the annexed drawings showing by way of example certain preferred embodiments of the invention, it being understood however that these drawings are given for the purpose of illustration only and do not define the scope of the invention.

On the drawings:

Fig. 8 is a schematic diagram illustrating the principle of operation of still further embodiment of the invention, in which use is made for a variable characteristic of amplitude of transmitted radiations.

Fig. 9 is a block diagram of an embodiment of the equipment which may be used at the receiving end for the reduction to practice of the method according to the invention illustrated in Fig. 8.

Fig. 10 is a schematic drawing illustrating the principle of operation of a still further embodiment of the invention, in which use is made for a variable characteristic of the amplitude of signals produced by a rotating beam of radiant energy.

Fig. 11 is a block diagram of an embodiment of the equipment which may be used at the receiving end for the reduction to practice of the method of operation of the invention illustrated in Fig. 10.

Fig. 12 is a schematic diagram illustrating the principle of a further embodiment of the invention in which use is made for a variable characteristic of the frequency of transmitted radiation.

Fig. 13 is a block diagram showing an example of embodiment of a receiving equipment which may be used in connection with the application of the invention illustrated in Fig. 12.

Figure 1:
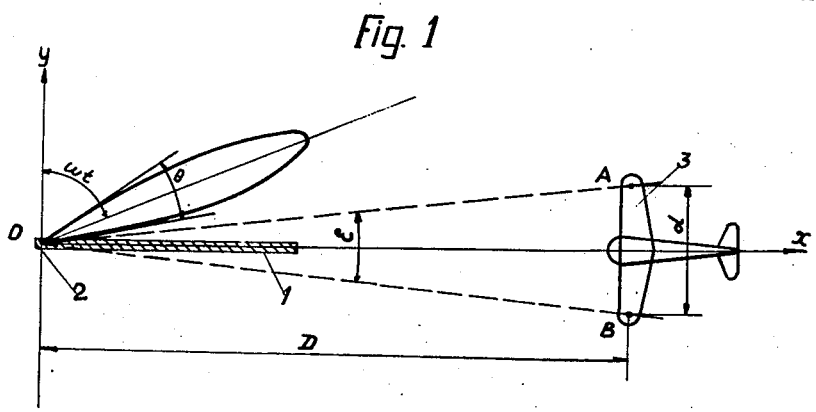
Fig. 1 shows a schematic diagram illustrating the invention applied to a blind landing of an aircraft.

Referring now to the drawings for a detailed description of the invention, it will be noted that Fig. 1 shows a landing runway 1 and a rotating radio beacon 2 provided with a directive aerial of great concentration adapted to produce a directive beam of radiant energy of ultra high frequency. This beam is rotated in azimuth at a uniform speed $\omega$. It results that space around point O is swept periodically by said beam of radiant energy. In 3 there is indicated, in a schematic manner, an airplane flying towards the landing runway 2 and the longitudinal axis of which is contained in the vertical plane of the axis of said runway. Airplane 3 is provided at the opposite extremities of its wings with two receiving aerials A and B which may be constituted, for instance, by two dipoles. Instead of a rotating beam, use may be made of a directive beam adapted to oscillate on either side of the desired direction of guiding such as the axis of landing runway 2. The amplitude of said oscillation may have any value on either side of said axis. The wave length of radiations of such a radio beacon will be made as short as possible.

Preferably, in order to increase or improve the accuracy of measures, the reception of signals by the two aerials will be effected in accordance with the disclosures of an earlier patent application of the same applicant filed under Serial No. 48,487 on September 9, 1948, which application describes a method of location in relation to time of signal pulses of a progressively variable form and which consists in using for defining the instant of reception of such a pulse and consequently of the instant of passage of the rotating beam by a point of location of a receiving aerial, a point of the curve of reception of such a signal corresponding to a predetermined level thereof outside of its maximum level.

A second transmitter which may be of a non directional type is provided in the vicinity of radio beacon 2, in order to produce a brief non-directional reference signal when the axis of the beam passes through direction OX. This reference signal may be transmitted also depending on the type of the receiving equipment used in association with the two receiving aerials, at the moment where the beam passes through a position making a predetermined angle with axis OX.

This last arrangement will be used when the receivers of the two aerials comprise limitor circuit arrangements according to the previously mentioned application Serial No. 48,487 filed on September 9, 1948.

The method according to the invention consists in using the signals produced by the passage of the beam by two aerials A and B for determining the distance of the craft to a point on a desired direction of guiding such as the direction of landing and conjointly with the reception of a reference signal corresponding to the passage of said beam through said direction or a direction making a certain angle with said desired direction, for determining deviations of the craft from said desired direction of guiding.

Figure 2:
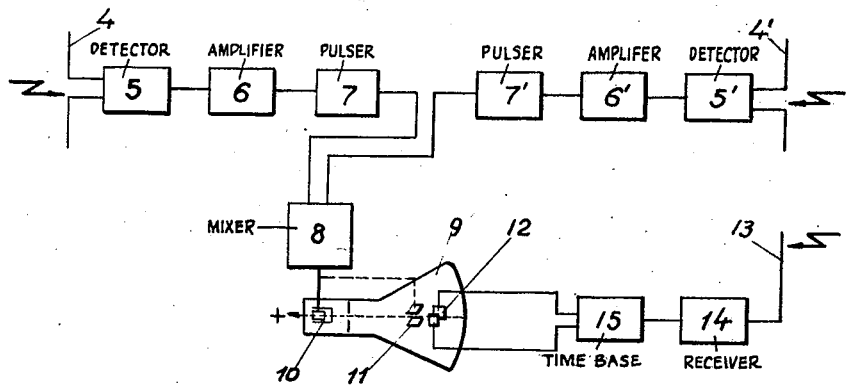
Fig. 2 shows a block diagram of an embodiment of a distance measuring apparatus or equipment which may be used for reducing to practice the method according to the invention.

Fig. 2 of the drawings shows a form of embodiment of the apparatus which may be used for this purpose.

On said figure reference numerals 4—4' indicate two spaced receiving aerials which may be constituted, as it has been already mentioned above, by dipoles each of which is followed by a detector 5—5', an amplifier 6—6' and a pulser 7—7'. The outputs of said pulsers 7—7' are connected to the input of a mixer 8 the output of which is connected to a control grid 10 of a cathode ray tube 9. The horizontal deflecting device of said tube is controlled by a time base device of a suitable type. In this way upon a passage of the beam by one and the other of the two aerials, there are produced on the screen of said tube two luminous points 18, the spacing of which one with respect to the other gives the measure of distance of the craft to the point of origin of the rotating beam, this in accordance with the earlier filed corresponding application Serial No. 50,515 dated September 9, 1948.

In order to produce simultaneously an indication of deviation of the craft with respect to a desired direction in azimuth, for instance with respect to the axis of a landing runway, as it will be explained now in detail, it is suggested according to the invention to control the time base device acting upon the horizontal deflecting system of the cathode ray tube, by the reference signal corresponding to the passage of the beam by a desired direction of guiding or a direction making a predetermined angle with said direction. For this purpose a special aerial 13 is made as a part of the equipment carried by the craft and is connected to a suitable receiver 14 comprising a detector and an amplifier.

Figures 3, 4:
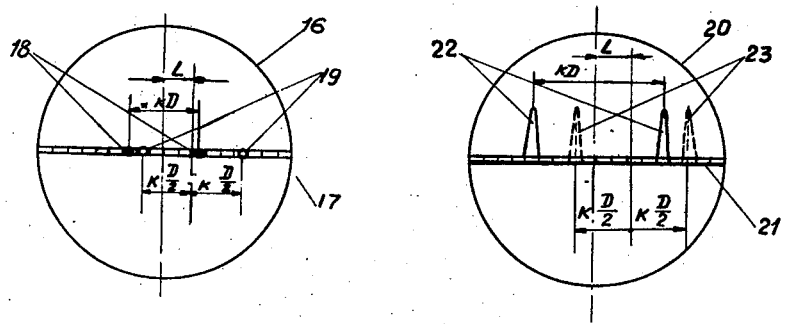
Fig. 3 shows a front view of the cathode ray tube screen as used in the apparatus according to Fig. 2 and which illustrates the manner in which distance and directional deviation indications of the craft with respect to a desired point may be obtained.
Fig. 4 shows another method of obtaining on a cathode ray screen indications of distance with those of deviation of the craft with respect to a desired direction of guiding.

The output of receiver 14 is adapted to control a time base device 15 so as to trigger the same by the reference signal. In this manner, angular displacements of the beam between the instant when it passes through the direction of a landing runway or in general a desired direction of guiding or else a direction making a predetermined angle with said desired direction and the respective instants of its passage through the points of location of the two receiving antennae A and B may be indicated on the screen of the cathode tube as shown in Fig. 3 by the position with respect to one side of the cathode tube screen of two luminous points 18 produced by signals received by said two aerials A and B. At the same time the spacing of said luminous points or signals from each other gives the distance of the craft to the transmitter or a desired point of landing.

By suitably correlating the speed of rotation of the beam, the speed of sweep of the screen under the action of the time base device and the angular position of the beam with respect to the desired direction of guiding at the instant of transmission of the reference signal, it is possible to obtain that the two luminous points 18 be symmetrically positioned on either side of the vertical diameter of the cathode ray tube screen when the craft carrying the receiving aerials follows the desired direction to or from point O. In Fig. 3 of the drawings, two luminous points 18 shown in black correspond to a condition when the craft follows the desired direction of guiding, whilst two dotted points 19 correspond to a condition when the craft is deviated to one side with respect to a desired direction. The output of mixer 3 may be connected to vertical deflecting plates 11 of cathode ray tube 9. In such a case, the indications are produced by vertical pulses 22, 23 appearing over the horizontal diameter of the cathode ray tube screen indicated in 20 on Fig. 4, said diameter being provided with a distance scale 21.

It follows from the above that in order to maintain a craft on a desired direction, the pilot must maintain the signals produced by the two aerials symmetrically spaced on either side of the vertical diameter of the cathode ray tube screen and he will be able to judge his distance to the desired point of destination which may be that of the landing by appreciating the spacing between the two signals, which spacing increases as the distance to the point of destination decreases.

Figure 5:
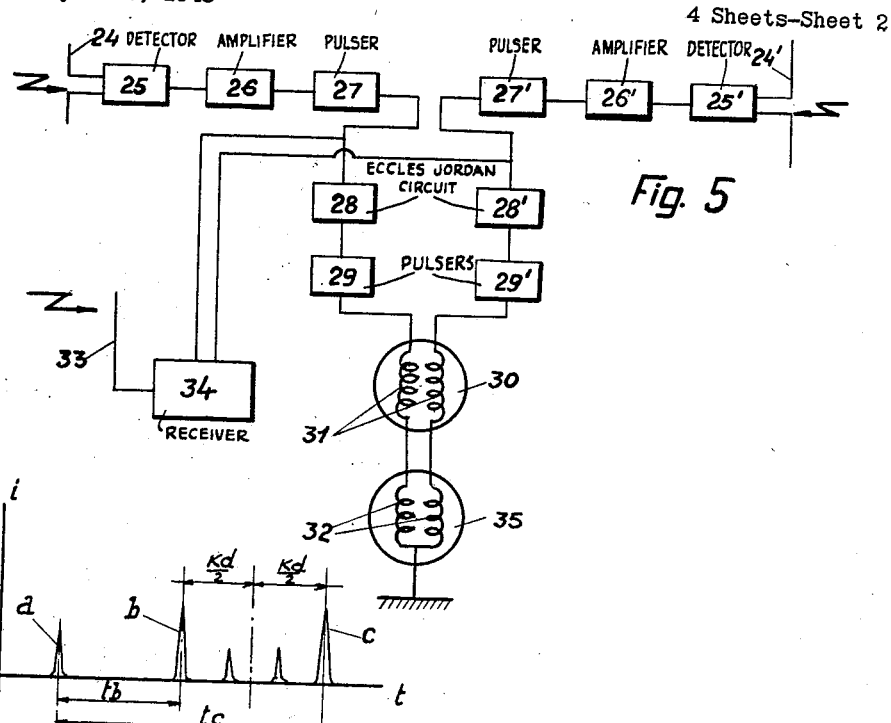
Fig. 5 shows a block diagram of a second embodiment of distance measuring apparatus which may be used for reducing to practice the method according to the invention.
Figure 6:
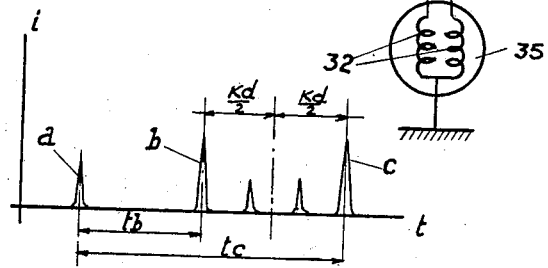
Fig. 6 is an explanatory diagram given for a better understanding of the operation of the apparatus according to Fig. 5
Figure 7:
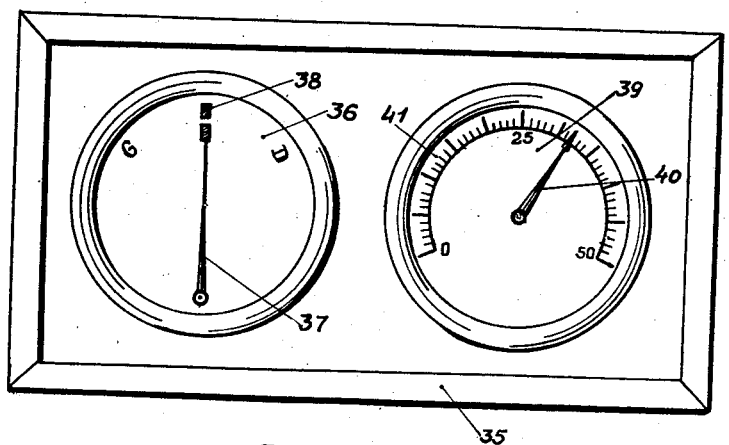
Fig. 7 shows an outside view of two pointer indicating instruments giving respectively deviation of the craft with respect to a desired direction of guiding and a measure of its distance to a given point as used in the apparatus according to Fig. 6.

Referring now to Figs. 5 and 6 of the drawing, these figures show another embodiment of the apparatus or equipment permitting to reduce to practice the method according to the invention.

In this embodiment of the invention use is made of pointer instruments in lieu of a cathode ray tube indicator for producing the indications of deviation of the craft from a desired direction of guiding and of its distance to a predetermined point and more particularly to a point of landing located on said direction. In this case, the receiving equipment comprises two receiving aerials 24—24' which may be constituted as previously by dipoles, and which are followed respectively by detectors 25—25', amplifiers 26—26' and pulsers 27—27'. The outputs of pulsers 27—27' are connected to Eccles-Jordan circuits 28—28' followed by filters 29—29', these latter being connected at their outputs to two galvanometer instruments of a double frame type 30—35 connected in series and arranged respectively for giving the indications of a sum and a difference of the output currents of the two receivers corresponding to the two aerials 24 and 24'.

Besides, a reference signal receiver equipment comprising antenna 33 and receiver 34 is connected in parallel to two receiving channels corresponding to aerials 24—24' at the input of Eccles-Jordan circuits 28—28' thereof. Thus said circuits 28—28' are controlled on one hand simultaneously by a pulse produced by a reference signal and on the other hand by two pulses corresponding respectively to the passage of the rotating beam by the points of location of two receiving aerials 24—24'. Plotted against a time base the control pulses appear as indicated schematically on Fig. 6 of the drawings where the reference pulse applied at the input of the Eccles-Jordan circuits is indicated at $a$ whilst the indicating pulses produced by two receiving aerials 24 and 24' are indicated respectively at $b$ and $c$, these latter pulses being spaced from said reference pulse by time intervals $t_b$ and $t_c$ respectively. Thus, the output current of circuit assembly 28—29 corresponding to aerial 24 measures the time interval $t_b$ and the output current of the other assembly 28'—29' corresponding to second aerial 24' measures the time interval $t_c$. The sum of these currents for a given spacing between two receiving aerials 24—24' has a constant predetermined value as long as the craft is on a desired direction defined by the reference signal and upon deviation of the craft to one or the other side of said direction, said value of the resulting current incerases and decreases according to the sense of said deviation. Consequently, by adding to each other the effects of said currents in a measuring instrument of a two coil type such as 30 (Fig. 5) it is possible to provide a direction guiding indicator 36 (Fig. 6) having a pointer 37 with a zero position corresponding to said predetermined value of the sum of the two output currents of the two receiving assemblies, this pointer deviating in one or in another direction in response to an increase or a decrease of said value according to a deviation of the craft to one or the other side of the desired direction.

Besides, the difference of said two currents is equal to zero for a certain distance of the craft carrying the receiving aerials, from the point of origin of the rotating beam, this difference increasing continuously with the approach of the craft to said point or in other words with the reduction of the distance to said point. Thus, by opposing the effects of said output currents in another instrument of a two coil type such as 39, it is possible to provide also an indicator giving the distance of the craft to a point of destination comprising a pointer 40 movable with respect to a scale graduated in units of distance such as 41. Preferably, the sense of said graduation is opposite to that of the movement of the pointer corresponding to the reduction of the distance to the point of origin of the rotating beam. In other words, the position of the pointer corresponding to the zero value of said difference of currents is that of the maximum graduation on the scale, whilst the zero graduation on the scale corresponds to the maximum value of said difference.

The invention as described above provides thus a new method and novel means for guiding a dirigible craft following a predetermined direction by means of a rotating beam of radiant energy and two receiving aerials provided on the craft, this guiding being effected by indicating or detecting a time interval between the passage of the beam by a direction defined by a reference signal and the passage of said beam by the two receiving aerials such as A and B. This method permits at the same time to determine the distance of the craft to the point of origin of said beam.

Referring now to Fig. 8 of the drawings, there is shown an embodiment of the invention making use for the variable characteristic, that is a characteristic or factor with respect to which a comparison is made between signals received by different receiving aerials with a view to produce a desired indication of guidance of the intensity of radiations as determined by the diagram of directivity or field pattern of a transmitting aerial as a function of the azimuth of a receiver.

By way of example, Fig. 8 illustrates this embodiment of the invention in its application to the guiding of an aircraft following a vertical plane passing through the axis of a landing runway, the equipment shown therein permitting at the same time to measure the distance of the craft to a point located on said axis.

As shown on said figure, a radio beacon 41 is located at point O on axis OX of a runway 42. Said beacon 41 projects by means of an aerial fed by a suitable transmitter, not shown, a directive beam of radiant energy following axis OX of said runway. Preferably, the transmitter produces ultra high frequency radiations, the field pattern of which is represented by curve 43. An aircraft indicated in 44 is provided with three receiving aerials, one of which A is placed at the extremity of the right wing of the craft, another B is placed at the extremity of the left wing of the craft and a third one C is placed on the front part of the fuselage of the craft, substantially midway between the two first aerials.

In order to locate the aircraft with respect to the vertical plane passing through axis OX, it is sufficient to compare the amplitudes of signals received by aerials A and B. The intensities of said signals are proportional to straight line segments $Oa$ and $Ob$. If these segments are equal, the aircraft or more precisely a point very nearly adjacent to the middle point of the base line A—B, is located in the vertical plane of axis OX. If these signals are unequal, the sense of their difference indicates whether the aircraft is to the right or to the left of said plane.

Besides, when an aircraft is in the vertical plane of axis OX, the ratio between the intensities of signals respectively received by aerials A and C is equal to $Oa/Oc$, and determines, according to Fig. 8 the angle $$\alpha = \widehat{coa} = \widehat{COA}$$

The base CA being known, this angle $\alpha$ is reversely proportional to distance OC and may therefore serve as a measure of said distance.

These indications of directional guidance and distance may be obtained for instance by means of a receiving equipment such as shown in Fig. 9 in which the receiving aerials A, B and C mentioned above are indicated respectively by reference numerals 45, 46 and 47. Each of said aerials is followed by a hyper-frequency detector and an amplifier indicated respectively by reference numerals 48 and 49 for aerial 45, by 50 and 51 for aerial 46, and by 52 and 53 for intermediary aerial 47. The outputs of amplifiers 49 and 51 corresponding to aerials 45 and 46 provided at the extremities of the aircraft wings may be connected to a measuring apparatus with a central zero point, such as indicated generally in 54 and which may be adapted to register a difference between the two received intensities both in value and in sign. This indicating apparatus may be graduated directly in degrees of angular deviation of the craft from a predetermined direction of guidance, provided an automatic volume control arrangement is used for eliminating the influence of distance. Preferably, however, use will be made for the indicating apparatus of a logometer or quotientmeter, which permits to eliminate the influence of distance without requiring the use of an automatic volume control and which may be graduated therefore directly in degrees.

In order to obtain now an indication of distance according to the principle indicated hereinabove, one or two measuring instruments 55, 56 of the central zero type, such as specified above, may be provided between the output of amplifier 53, and amplifiers 49 and 51 respectively corresponding to the middle aerial 47 and the two aerials 45 and 46 provided at the extremities of the aircraft wings. However, in such a case also, in order to render the indications independent of distance between the dirigible craft and the radio beacon, it is preferable to use a quotientmeter or logometer as a measuring instrument, so as to eliminate the influence of distance without requiring the provision of an automatic volume control. In such a case, the indicator may be directly graduated in units of distance.

This arrangement permits thus to guide a dirigible craft following a given direction and to have at each moment the indication of distance separating said craft from the radio beacon, this result being obtained with the help of a single beam of radiant energy of a fixed direction in space whereby a noticeable simplification and consequently a reduction of cost of the ground installation is achieved. Furthermore, this arrangement permits to obtain a better efficiency when compared to systems making use either of a single rotating beam of radiant energy or of two beams of fixed direction modulated or manipulated in a complementary manner and partially overlapping each other.

Referring now to Fig. 10, this figure shows an embodiment of the invention based on the use for the variable characteristic of the amplitude of signals such as determined by the passage of a rotating beam of radiant energy by the location of three spaced aerials arranged on a craft such as an aircraft, in a manner similar to that previously described.

On said figure, the directive beam of radiant energy 57 is again constituted by radiations of ultra high frequency and the same is rotated in azimuth at an uniform speed $\omega$. This beam is produced by a rotating radio beacon 58 located at one extremity of a runway 59, for instance. An aircraft such as 60 is provided as previously with two aerials A and B at the extremities of its wings and with a centrally disposed aerial C.

As in the case of the embodiment described above, the desired direction of guidance such as axis OX of a landing runway 59, is indexed by a reference signal, generally of omni-directional type which may be produced by a suitable transmitter associated with the radio beacon, at the moment of passage of the rotating beam by a predetermined position making a predetermined angle such as $\gamma$ with said desired direction. This reference signal is received on the craft by a separate aerial and a corresponding receiver and serves as a basis for determining deviations of the craft from the desired direction of guidance. In this particular embodiment of the invention, said deviation is measured by the time interval which elapses between the instant of passage of the rotating beam of radiant energy by the position indexed by said reference signal and the instant of passage of said beam by the position of the middle point of the straight line segment A—B separating the two receiving antennae A and B of the craft, this latter instant being determined by the equality of amplitudes of signals received by said two antennae.

In fact, it can be easily understood that when the rotating beam passes by the middle point of base line A—B, the amplitudes of signals received by aerials A and B are respectively equal to polar radii OA and OB. It results that by measuring and comparing the amplitudes of signals received by two aerials A and B, it is possible to determine with precision the instant of passage of a rotating beam of radiant energy by the middle point of the distance separating these aerials. By causing then a predetermined locally produced signal or pulse to correspond to said instant, it is possible to determine at each revolution of the beam the deviation of the craft from a desired direction of guidance by measuring or indicating the interval of time separating said locally produced signal from the reference signal.

It is evident that the method remains the same whether use is made of a radio beacon with a rotating or an oscillating beam or whether this reference signal is an omnidirectional signal or a signal of more or less pronounced directivity, projected in space following the desired direction of guiding.

If a comparison is made on the other hand between the intensities of signals received either by antennae A and C or C and B, it is possible to determine in the same manner the instant of passage of the rotating beam by the middle point of the distance separating the either two of said two pairs of aerials. Once this or these instants are determined, the interval of time separating either these two instants or one of said instants and the instant of passage of the rotating beam by the middle point of the base line A—B previously determined, can give the measure of the distance of the craft with respect to the radio beacon or in a general way to the point of origin of the rotating beam.

In fact, if distance A—B is very small in comparison with distance OC, one has for instance:

$$OC = AR/2\alpha = K/\alpha$$

It is possible thus to provide a system for guiding dirigible crafts, giving the indications of deviation of the craft from a predetermined direction as well as of its distance to a transmitter of a rotating or an oscillating beam of radiant energy by measuring and comparing the amplitudes of signals received by spaced and independent aerials carried by the craft.

Referring now to Fig. 11 of the drawings, there is shown an example of the receiving equipment or apparatus which may be used in the embodiment of the invention described hereinabove.

The receiving aerials are indicated on said figure by reference numerals 61, 62, 63 and 64, the latter serving for the reception of the reference signal. Each of aerials 61 and 62 provided at the opposite extremities of the wings of an aircraft is connected to an ultra high frequency detector 65, 66 followed by an amplifier 67, 68. The outputs of said amplifiers are connected to the input of an amplitude comparator instrument 69 which may be constituted for instance by two vacuum tubes mounted in a balanced relationship. The output of said instrument having two conductors of opposite polarities may feed any suitable indicating device, these conductors conducting respectively currents of opposite sign depending whether the amplitude of signals received by one of aerials 61 and 62 is greater than the amplitude of signals received by the other of said aerials, no current being present in said two conductors when the two amplitudes are equal.

In order to produce the desired indication, one can proceed in different ways, but preferably use is made of a cathode ray tube or an oscilloscope, such as schematically indicated in 70. To this effect, the output conductor of negative polarity 71 of the amplitude comparator 69 is connected to a negative rectifier 72, the output of which is connected together with the other output conductor 73 of the amplitude comparator 69, by the intermediary of a D. C. amplifier 74 to a control grid 75 of the cathode ray tube 70. The mounting of said cathode ray tube, the details of which are not shown, is effected so that when the output potential of the amplitude comparator 69 passes through a zero value, that is, when the amplitudes of signals received by two aerials 61 and 62 are equal to each other, control grid 75 causes a luminous point to appear on the screen of the cathode ray tube 70. It is understood that a blocking device, not shown, will prevent the appearance of a luminous point when the amplitudes are nul (and equal).

In order to relate this point to a desired direction of guidance, the horizontal sweeping of the cathode ray tube is produced by a base time device indicated generally at 76, and which is adapted to be triggered by the reference signal. For this purpose, said base time device 76 is connected to the output of a reference signal receiver 77 connected to a corresponding aerial 64. As the reference signal is produced for a well determined position of the rotating beam with respect to the desired direction of guiding, it is evident that the whole assembly may be established so that a luminous point corresponding to the passage of the axis of the beam by the middle point of base line A—B, appears on the vertical axis of symmetry of the cathode ray tube screen when the craft is on said desired direction of guidance, said point moving to the right or to the left of said axis in response to deviations of the craft to one or the other side of said direction.

By associating with the middle aerial 63 a receiver comprising an ultra high frequency detector 78 followed by an amplifier 79 and by connecting the output of said amplifier 79 as well as the output of an amplifier 67 or 68 to a second amplitude comparator device of the same type as previously specified, such as 80 or 81, it is possible to determine in the same manner the instant of passage of the rotating beam by the middle point of distance AC or CB. By measuring then the time interval between this instant and that when the rotating beam passes by the middle point of the main base line AB, it is possible to obtain an indication of distance of the craft from the point of origin of said rotating or oscillating beam.

This indication may be produced for instance by causing one of the amplitude comparator devices 80 or 81 to act on Wehnelt 75 of the cathode ray tube 70, so as to cause a second luminous point to appear on the screen of the tube beside the first point but spaced therefrom by a distance reversely proportional to the distance of the craft with respect to the point of origin of the rotating beam.

It is possible also to use simultaneously two supplementary amplitude comparator devices 80 and 81 provided between the output of amplifier 79 corresponding to the middle antenna 63 and the respective outputs of amplifiers 67 and 68 corresponding to aerials 61 and 62. The outputs of said amplitude comparator devices may be caused then to act on the cathode ray tube, so as to produce two luminous points, the position of which with respect to the vertical axis of the screen of said tube will indicate the sense and the amount of deviation of the craft with respect to the desired direction and the spacing of which one from the other will correspond to the distance separating the craft from the point of origin of the rotating beam of radiant energy.

Referring now to Figure 12 of the drawings, this figure shows an embodiment of the invention, in which it is the frequency of produced radiations that is used as the variable characteristic for producing the desired indications according to the invention. This embodiment is characterized by the use at the transmitting end of the system of an ultra high frequency dispersive aerial fed either by non monochromatic oscillations or by oscillations having a rapidly variable frequency. This aerial is placed as previously at point O which may represent one extremity of a landing runway indicated in dotted lines in 82. According to frequency applied to said aerial and which may be periodically varied, the radiation pattern of said aerial may be made to oscillate on either side of the desired axis of guidance such as OX, the frequency of transmitted radiations varying thus as a function of the azimuth of the axis of said radiation pattern as illustrated in Fig. 12, in which said radiation pattern is shown in its two extreme and its centred positions respectively characterized by three frequencies F1, F2 and F0.

Consequently, by comparing the frequencies received by two aerials such as A and B located at the tips of the wings of an aircraft such as 83 for instance, or by one of the lateral aerials such as A or B and by a central aerial C, it is possible to determine deviations of the craft, from the desired direction of guidance as well as the distance of the craft, with respect to the transmitter of said radiations as it was the case with the first embodiment of the invention described hereinabove, with only difference that in the present case, these indications are determined by a difference in frequencies instead of being determined by a difference in amplitude.

Figure 13 of the drawings shows a possible arrangement of the receiving equipment or apparatus which may be used in this latter embodiment of the invention. The three receiving aerials are indicated on said figure by reference numerals 84, 85, 86. These aerials are followed by receivers 87, 88, 89 respectively tuned on frequencies F1, F2, F0, corresponding to extreme positions and to the middle position of the radiated beam, so that when the craft deviates from the desired direction, defined by the beam position corresponding to frequency F0, aerials A and B will receive signals of unequal frequencies which will give, after discrimination and detection, signals of equal amplitudes which may be used then for producing desired indications in a manner similar to that previously described with reference to Figures 8 and 9. The receivers used in this embodiment of the invention may be constituted by resonant volumes tuned on corresponding frequencies and followed by discriminator detector arrangements 90, 91, 92 which latter may feed quotientmeters or logometers 93 and 94 or 95 giving respectively as in the case of Figures 8 and 9 the values of directional deviation and of the distance of the craft with respect to the radio beacon.

The invention provides thus an improved system of directional guiding of a craft, whereby a permanent indication of deviation of the craft from a desired direction of guidance may be obtained and this simultaneously with an indication of distance separating the craft from a desired point on said direction and namely a point of location of the transmitter of the rotating or oscillating beam of radiant energy.

These indications of directional guidance and distance are obtained by producing radiations presenting a characteristic variable as a function of azimuth of a receiver, by receiving said radiations on at least two spaced and independent aerials and by comparing the signals received by said aerials in relation to said variable characteristic.

The comparison between the received signals may be effected in relation to time or an inherent characteristic of the radiations such as amplitude, phase or frequency which may be made variable in relation to time, azimuth or distance of the craft with respect to the point of origin of said radiations.

Although several embodiments of the invention have been described and illustrated, it is understood that the same is not limited to said embodiments but may receive various changes or modifications evident to men skilled in the art without departing from the spirit of the invention.

What is claimed is:

1. A system for guiding a craft following a predetermined direction comprising in combination means at one point on said direction for transmitting a beam of radiant energy presenting a variable characteristic in relation to said direction and means on the craft for receiving said beam of radiant energy comprising at least two sidewise spaced and independent aerials, receiver means connected to said aerials and receiver means using the outputs of said receiver means as determined by the reception of said beam by the respective aerials for producing indications of lateral displacement of the craft from said predetermined direction and of its distance to or from a point on said direction.

2. A system for guiding a craft following a predetermined direction comprising in combination means at one point on said direction for transmitting a beam of radiant energy angularly movable in azimuth as a function of time, means for producing a reference signal indexing the passage of said beam through a predetermined position in relation to said direction and means on the craft for receiving said beam and said reference signal, said means comprising at least two sidewise spaced receiving aerials cooperating with said beam and one separate receiving aerial intended for reception of said reference signal, receivers associated with said aerials and means using the outputs of said receivers for producing indications of deviation of the craft from said predetermined direction and of distance to or from a point on said direction.

3. A system according to claim 2 comprising means using the outputs of said receivers for comparing in relation to time, under a control of the reference signal, the position of received signals by the two spaced aerials.

4. A system according to claim 2 comprising means for comparing signals received by two aerials cooperating with the rotating beam, as regards their spacing in time one from the other in order to produce an indication of distance of the craft to a point on the desired direction of guidance and as regards their spacing in relation to time with respect to the reference signal received by the third aerial in order to produce an indication of deviation of the craft from said desired direction.

5. A system as claimed in claim 2 comprising a cathode ray oscilloscope and means using the outputs of said receivers for comparing on said oscilloscope, as regards their spacing in time, the signals received by the two spaced aerials and the reference signal received by the third aerial so as to obtain simultaneously on a single dial or screen an indication of deviation of the craft from the desired direction and of its distance to or from a point on said direction.

6. A system for guiding a craft following a predetermined direction comprising in combination means at one point on said direction for transmitting a beam of radiant energy angularly movable in azimuth as a function of time, means for producing a reference signal indexing the passage of said beam through a predetermined position in relation to said direction and means on the craft for receiving said beam and said reference signal, said means comprising at least two sidewise spaced receiving aerials cooperating with said beam and one separate receiving aerial intended for reception of said reference signal, receivers associated with said aerials, a cathode ray tube oscilloscope and means using the outputs of said receivers for controlling said oscilloscope so as to produce on its screen luminous signals defining on said screen a segment of straight line, the length of which is proportional to the distance of the craft from or to a predetermined point on the desired direction of guiding, which may be the landing point of the craft, and the position of which along the horizontal diameter of said screen with respect to the vertical diameter of the same gives an indication of deviation of the craft to one or to the other side of the vertical plane containing said desired direction of guiding.

7. A system for guiding a craft following a predetermined direction comprising in combination means at one point on said direction for transmitting a beam of radiant energy angularly movable in azimuth as a function of time, means for producing a reference signal indexing the passage of said beam through a predetermined position in relation to said direction and means on the craft for receiving said beam and said reference signal, said means comprising at least two sidewise spaced receiving aerials cooperating with said beam and one separate receiving aerial intended for reception of said reference signal, receivers associated with said aerials, a cathode ray tube oscilloscope and means using the outputs of said receivers for controlling said oscilloscope so as to cause signals received by the two spaced aerials to produce on the screen of said tube, under the control of the reference signal, two spaced luminous signals, more particularly two points the spacing of which with respect to each other is proportional to the distance of the craft with respect to a point on the desired direction of guiding and more particularly the point of landing and the position of which with respect to the vertical reference axis of the cathode tube screen gives an indication of deviation of the craft to one or the other side of the vertical plane containing the desired direction of guiding or the glide path.

8. A system as claimed in claim 7 comprising means for causing the output of the reference signal receiver to trigger a time base device controlling one of the deflection control devices of said tube and means for causing the outputs corresponding to the two spaced aerials to act on the control grid of said tube.

9. A system as claimed in claim 7 comprising means for causing the output of the reference signal receiver to trigger a time base device controlling one of the deflection control devices of said tube and means for causing the outputs corresponding to the two spaced aerials to act on the other of said deflection control devices of said tube.

10. A system as claimed in claim 7 comprising means for causing the output of the reference signal receiver to trigger a time base device controlling the horizontal sweep of the tube and means for causing the outputs corresponding to the two spaced aerials to act on the control grid of said tube.

11. A system as claimed in claim 2 in which receivers associated with spaced aerials cooperating with the beam of radiant energy comprise means for positioning in relation to time signal curves received by each of said aerial by sharply defined locally produced pulses corresponding to a point on said curves defined by a predetermined signal level having a predetermined relation with the maximum signal level whereby signals used for producing the indications are constituted by said pulses.

12. A system for guiding a craft following a predetermined direction comprising in combination means at one point on said direction for transmitting a beam of radiant energy angularly movable in azimuth as a function of time, means for producing a reference signal indexing the passage of said beam through a predetermined position in relation to said direction and means on the craft for receiving said beam and said reference signal, said means comprising at least two sidewise spaced receiving aerials cooperating with said beam and one separate receiving aerial intended for reception of said reference signal, receivers associated with said aerials, means for combining the outputs of said receivers under the control of the reference signal so as to provide an indication of distance and an indication of position of the craft with respect to said direction by values of currents or voltages respectively proportional to a sum and a difference of time spacing of signals received by the two spaced aerials with respect to the reference signal.

13. A system as claimed in claim 12 in which means for combining the outputs of said receivers comprise an Eccles-Jordan type circuit followed by a filter in each of the channels corresponding to the spaced receiving aerials, means for connecting the reference signal receiver in parallel to said channels at the input of said Eccles-Jordan type circuits and means comprising two indicators of a double coil type adapted to indicate respectively a sum and a difference of its feeding currents or voltages connected in series to the output of said filters.

14. A system for guiding a dirigible craft along a desired ground track comprising means transmitting along said desired ground track a beam of radiant energy of a fixed axis, means for receiving said beam on the craft comprising at least three laterally spaced and independent aerials, means for comparing signal amplitudes received by two lateral aerials in order to produce an indication of lateral displacement of the craft from said ground track, and means for comparing signal amplitudes received by one of the lateral aerials and the central aerial in order to produce an indication of distance of the craft to a point on said direction.

15. A system as claimed in claim 14 in which the means for comparing the values of signal amplitudes to provide the desired indications are logometers.

16. A system for guiding a dirigible craft along a desired ground track comprising means transmitting in relation to said ground track wave energy radiations presenting a variable characteristic in azimuth and means for receiving said radiations on the craft comprising a central aerial and two equally spaced lateral aerials, means for comparing in relation to said variable characteristic the signals received by said lateral aerials to provide an indication of lateral displacement of the craft from said ground track and means for comparing in relation to said variable characteristic the signals received by said central aerial and one of said lateral aerials to provide an indication of distance of the craft to a point on said track.

17. A system as claimed in claim 16 comprising a directive beam of radiant energy having a direction variable with frequency of said energy, means for comparing signal frequencies received by said lateral aerials to provide an indication of comparing signal frequencies received by said lateral displacement of the craft from the direction of a desired ground track and means for central aerial and one of said lateral aerials to provide an indication of its distance to a point on said ground track.

18. A system as claimed in claim 16 comprising a very high frequency dispersive aerial fed by radiations of a rapidly varying frequency.

19. A system for guiding a craft following a predetermined ground track comprising in combination means at one point on said ground track for transmitting a beam of radiant energy angularly movable in azimuth as a function of time, means for producing a reference signal indexing the passage of said beam through a predetermined direction in relation to said ground track and means on the craft for receiving said beam and said reference signal, said means comprising at least two sidewise spaced receiving aerials cooperating with said beam and one separate receiving aerial intended for reception of said reference signal, means for determining the instant of passage of said beam by the middle point of distance separating the two aerials by comparing signal amplitudes received by said two aerials, means for producing a signal, when said amplitudes are equal and means measuring the time interval between the instant thus defined and the instant of reception of the reference signal to provide an indication of lateral displacement of the craft from said desired ground track.

20. A system as claimed in claim 19 comprising as indicating means a cathode ray tube oscilloscope, said oscilloscope being controlled so as to detect the instant of passage of the rotating beam by the longitudinal axis of the craft or the axis of the receiving system carried by said craft, by a luminous signal appearing on the screen of said tube and the position of which with respect to the vertical axis of the screen gives the indication of deviation of the craft from the desired direction of guidance.

21. A system for guiding a craft following a predetermined ground track comprising in combination means at one point on said ground track for transmitting a beam of radiant energy angularly movable in azimuth as a function of time, means for producing a reference signal indexing the passage of said beam through a predetermined direction in relation to said ground track and means on the craft for receiving said beam and said reference signal, said means comprising a central aerial, two lateral aerials equally spaced from said central aerial and a reference signal receiving aerial, means for comparing signal amplitudes received by said lateral aerials to determine the instant of passage of said beam by the midway point between said aerials, means for comparing signal amplitudes received by one or two of said lateral aerials and the central aerial to determine the instant or instants of passage of said beam by a point or points midway between said aerials and means measuring the time interval between thus defined instants to provide an indication of distance of the craft to the point of origin of said beam and its lateral displacement with respect to said desired ground track passing through said point of origin.

22. A system as claimed in claim 20 comprising as indicating means a cathode ray tube oscilloscope said oscilloscope being controlled so as to index the instants of passage of the beam by the middle point of the distances separating the three aerials taken two by two by luminous points or signals appearing on its screen and the spacing of which gives an indication of distance and the relative position of which with respect to the center of the screen gives the indication of lateral displacement of the craft with respect to the desired ground track.

23. A method of guiding a dirigible craft and more particularly an aircraft along a desired direction which consists in transmitting in relation to said direction wave energy radiations presenting in azimuth a variable characteristic, in receiving said radiations on said craft at three transversely spaced points, in comparing, in relation to said variable characteristic, signals received at the outer two of said three points for obtaining an indication of lateral displacement of the craft with respect to said direction and in correlating the signals received at one of said outer points and at the intermediate point for obtaining the indication of its distance to a point on said direction.

24. A method of guiding a dirigible craft and more particularly an aircraft along a desired direction which consists in producing in relation to said direction a directive beam of radiant energy caused to vary its direction in azimuth as a function of time, in receiving said beam at least at two spaced points on said craft and in comparing in relation to time signals received at said points for obtaining an indication of deviation of the craft from said direction and of its distance to a point on said direction.

25. A method of guiding a dirigible craft and more particularly an aircraft along a desired direction which consists in producing in relation to said direction a directive beam of radiant energy caused to vary its direction in azimuth as a function of time, in receiving said beam at least at two spaced points on said craft, in producing upon the passage of the beam by a predetermined position with respect to said desired direction, a reference signal, in receiving said signal on the craft and in comparing in relation to time said reference signal and said signals received at said spaced points for obtaining an indication of deviation of the craft from said direction and of its distance to a point on said direction.

26. A method of guiding a dirigible craft and more particularly an aircraft along a desired direction which consists in producing in relation to said direction a directive beam of radiant energy adapted to rotate in azimuth, in receiving said beam at least at two spaced points on said craft, in producing upon the passage of the beam by a predetermined direction with respect to said desired direction a reference signal, in receiving said signal on the craft and in using said signal to control the reception of said rotating beam of radiant energy at said spaced points to produce indications of displacement of the craft from said direction and of its distance to or from the point of origin of said rotating beam.

27. A method of guiding a craft as claimed in claim 26 according to which the indications of guidance along a ground track and of distance to a point on said track are produced by combining, under the control of the reference signal, the signals induced at the two spaced points on the craft by the beam of radiant energy.

28. A method of guiding a craft following a desired direction which consists in producing at a point on said direction a directive beam of wave energy radiations which is adapted to rotate in azimuth at a uniform speed, in producing at the moment of passage of said beam by said desired direction of guiding or a direction having a predetermined angle with respect to said first direction, a brief reference signal, in receiving the radiations of said rotating beam at least at two spaced points on the craft to be guided and defining on said craft a distance measuring base line, in receiving said reference signal on the craft, in detecting and amplifying the signals thus received and comparing on a time basis, under the control of said reference signal, the signals received under the action of said beam at said two spaced points to obtain simultaneously an indication of displacement of the craft from the direction of guiding as well as an indication of its distance to a predetermined point on said direction.

29. A method of guiding a craft as claimed in claim 28 in which the signals received at two spaced points are compared one to the other as regards their spacing in time in order to produce a desired indication of distance and with respect to the reference signal for determining the deviation of the craft to one or to another side of the desired direction.

30. A method of guiding a dirigible craft and more particularly an aircraft along a desired direction which consists in transmitting in relation to said direction wave energy radiations presenting in azimuth a variable characteristic which is the amplitude of transmitted radiations, determined as a function of the azimuth of a receiving aerial, by the field pattern of said radiations, in receiving said radiations at least at three spaced points on said craft and in comparing the values of signal amplitudes received at said three points taken two by two for obtaining indications of lateral displacement of the craft with respect to said direction and of distance of the craft to a point on said direction.

31. A method of guiding a dirigible craft and more particularly an aircraft along a desired direction which consists in producing in relation to said direction a directive beam of radiant energy caused to vary its direction in azimuth as a function of time, in receiving said beam at least at two spaced points on said craft, in producing upon the passage of the beam by a predetermined position with respect to the direction, a reference signal, in receiving said signal on the craft, in comparing signal amplitudes received at said two points so as to determine the instant of passage of the beam by the mid-distance of said points and measuring the time interval between said instant and the instant of reception of the reference signal for obtaining an indication of deviation of the craft from said direction and of its distance to a point on said direction.

32. A method of guiding a dirigible craft along a desired direction which consists in producing in relation to said direction a directive beam of radiant energy caused to vary its direction in azimuth as a function of time, in receiving said beam at three laterally spaced points on the craft, in producing upon the passage of the beam by a predetermined direction with respect to said desired direction a reference signal, in receiving said reference signal on the craft, in determining the instant of passage of the beam by the mid-distance point between a central point and one or each of two lateral points, by comparing the signal amplitudes received at said points and in providing an indication of distance of the craft to the origin of said beam by measuring the time interval between said two instants.

33. A method of guiding a dirigible craft and more particularly an aircraft along a desired direction which consists in producing in relation to said direction a directive beam of radiant energy presenting in azimuth a variable characteristic which is the frequency of transmitted radiations determined as a function of azimuth of a receiving aerial by the field pattern of said radiations variable in direction with frequency, in receiving said radiations at least at three laterally spaced points carried by the craft and in producing the indications of deviation of the craft with respect to said desired direction and of distance to a point on said direction by comparing the frequency values received at said points taken two by two.

References Cited in the file of this patent

UNITED STATES PATENTS

| Number | Name | Date |
|---|---|---|
| 1,890,786 | Johnston | Dec. 13, 1932 |
| 1,983,079 | Hansen | Dec. 4, 1934 |
| 2,010,968 | Smith | Aug. 13, 1935 |
| 2,234,654 | Runge | Mar. 11, 1941 |
| 2,402,410 | Kear | June 18, 1946 |
| 2,422,691 | Mason | June 24, 1947 |
| 2,479,567 | Hallman | Aug. 23, 1949 |